(12) United States Patent
Du

(10) Patent No.: US 9,758,651 B2
(45) Date of Patent: Sep. 12, 2017

(54) RUBBER COMPOSITION AND PNEUMATIC TIRE

(71) Applicant: The Goodyear Tire & Rubber Company, Akron, OH (US)

(72) Inventor: Ling Du, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/451,719

(22) Filed: Aug. 5, 2014

(65) Prior Publication Data

US 2016/0039998 A1 Feb. 11, 2016

(51) Int. Cl.
| | |
|---|---|
| C08L 9/00 | (2006.01) |
| C08L 9/06 | (2006.01) |
| C08K 3/36 | (2006.01) |
| C08K 5/09 | (2006.01) |
| B60C 1/00 | (2006.01) |
| C08L 79/02 | (2006.01) |

(52) U.S. Cl.
CPC ...... *C08L 9/06* (2013.01); *B60C 1/00* (2013.01); *B60C 1/0016* (2013.01); *C08K 3/36* (2013.01); *C08K 5/09* (2013.01); *C08L 9/00* (2013.01); *C08L 79/02* (2013.01)

(58) Field of Classification Search
CPC ........ C08L 21/00; C08L 9/00; C08L 2205/02; C08L 9/06; C08L 79/02; C08K 3/36; C08K 5/17; C08K 5/09; C08K 5/5419; C08K 5/548; B60C 1/0016; B60C 1/00
USPC .......................................................... 524/262
See application file for complete search history.

(56) References Cited

U.S. PATENT DOCUMENTS

| | | | |
|---|---|---|---|
| 3,431,231 A | | 3/1969 | Darcy et al. |
| 3,867,326 A | | 2/1975 | Rivin et al. |
| 3,953,223 A | | 4/1976 | Doran, Jr. et al. |
| 3,994,742 A | | 11/1976 | Russell et al. |
| 4,517,336 A | * | 5/1985 | Wolff et al. ................... 524/571 |
| 7,714,051 B2 | | 5/2010 | Hahn |
| 2004/0254301 A1 | | 12/2004 | Tsukimawashi et al. |
| 2007/0037916 A1 | * | 2/2007 | Watanabe ................. B60C 1/00 524/493 |
| 2012/0029114 A1 | * | 2/2012 | Francik .................. C08L 15/00 523/156 |
| 2014/0155542 A1 | | 6/2014 | Kaszas |

FOREIGN PATENT DOCUMENTS

| | | |
|---|---|---|
| CN | 1745134 A | 3/2006 |
| CN | 101063001 A | 10/2007 |
| EP | 1887038 A1 | 2/2008 |
| EP | 2690135 A1 | 1/2014 |
| WO | WO 2013147827 A1 * | 10/2013 |

OTHER PUBLICATIONS

European Search Report dated Dec. 4, 2015 for Application Serial No. EP15179467.

* cited by examiner

*Primary Examiner* — Angela C Scott
(74) *Attorney, Agent, or Firm* — John D. DeLong

(57) ABSTRACT

There is disclosed a vulcanizable rubber composition comprising: (A) a diene based elastomer, (B) from 50 to 150 parts by weight, per 100 parts by weight of elastomer (phr), of silica; (C) from 0.15 to 0.45 phr of a polymeric amine comprising a primary amine functionality; and (D) from 1.5 to 2.5 parts by weight, per 1 part by weight of the polymeric amine, of an aromatic carboxylic acid or aromatic acid anhydride.

11 Claims, 1 Drawing Sheet

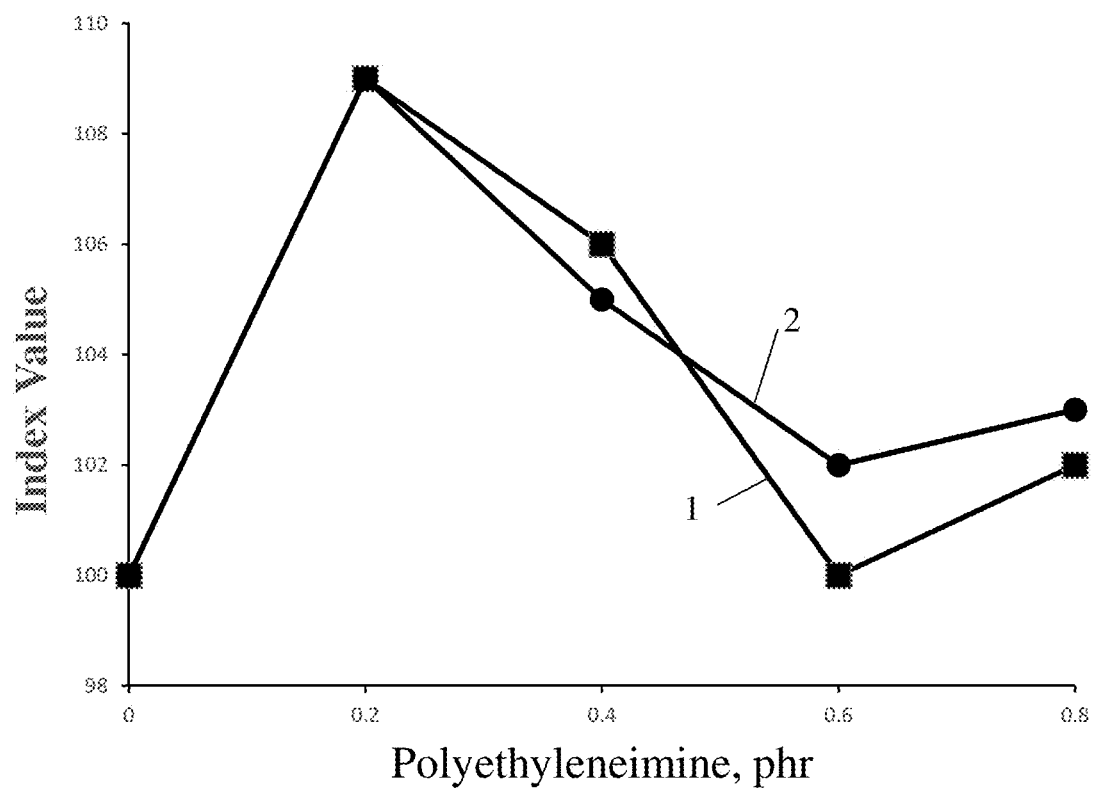

RUBBER COMPOSITION AND PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the tread wear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

SUMMARY OF THE INVENTION

The present invention more specifically is directed to a vulcanizable rubber composition comprising:
(A) a diene based elastomer,
(B) from 50 to 150 parts by weight, per 100 parts by weight of elastomer (phr), of silica;
(C) from 0.15 to 0.45 phr of a polymeric amine comprising a primary amine functionality; and
(D) from 1.5 to 2.5 parts by weight, per 1 part by weight of the polymeric amine, of an aromatic carboxylic acid or aromatic acid anhydride.

The invention is further directed to a pneumatic tire comprising the rubber composition.

BRIEF DESCRIPTION OF THE DRAWINGS

FIG. 1 shows a graph of rolling resistance index and wear resistance index against polyethyleneimine amount for an SA/PEI weight ratio of 2.

DETAILED DESCRIPTION OF THE INVENTION

There is disclosed a vulcanizable rubber composition comprising:
(A) a diene based elastomer,
(B) from 50 to 150 parts by weight, per 100 parts by weight of elastomer (phr), of silica;
(C) from 0.15 to 0.45 phr of a polymeric amine comprising a primary amine functionality; and
(D) from 1.5 to 2.5 parts by weight, per 1 part by weight of the polymeric amine, of an aromatic carboxylic acid or aromatic acid anhydride.

There is further disclosed a pneumatic tire comprising the rubber composition.

The rubber composition may include one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/ dicyclopentadiene terpolymers. Additional examples of rubbers which may be used include solution polymerized polymers (SBR, BR, IR, IBR and SIBR) functionalized with groups such as amine including primary, secondary and tertiary amines, alkoxy including monoalkoxy, dialkoxy, and trialkoxy, silyl, thiols, thioester, thioether, sulfanyl, mercapto, sulfide, and combinations thereof. Such functionalized solution polymerized polymers may be functionalized at the polymer chain ends for example via functional initiators or terminators, or within the polymer chains for example via functional monomers, or a combination of in-chain and end-of-chain functionalization. Specific examples of suitable functional solution polymerized polymers include those described in U.S. Pat. No. 7,342,070 having amine and alkoxysilyl functionality, and those described in U.S. Pat. Nos. 8,217,103 and 8,569,409 having alkoxysilyl and sulfide (i.e. thioether) functionality. Such thiol functionality includes thiol or sulfanyl functionality arising from cleavage of sulfur containing groups during compound processing, such as for example from thioesters and thioethers. The preferred rubber or elastomers are polyisoprene (natural or synthetic), polybutadiene and SBR and their functionalized versions.

Also included are silicon-coupled and tin-coupled star-branched polymers.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition further includes a polymeric amine, where the polymeric amine has a primary amine functionality. Suitable polymeric amines include but are not limited to polyethyleneimine, polypropyleneimine, and polyoxyalkylene amines.

In one embodiment, the polymeric amine is a polyethyleneimine In one embodiment, the polyethyleneimine has an average molecular weight of 800 to 2000000, preferably 1000 to 20000, more preferably 2000 to 4000. Suitable polyethyleneimine is available commercially as Lupasol from BASF.

In one embodiment, the polymeric amine is a polyoxyalkylene amine. The polyoxyalkylene amine can include a polyoxyalkylene monoamine, diamine, triamine, or combinations thereof. These compounds are defined by an amino group attached to a terminus of a polyether backbone and, thus, are considered polyether amines. The amino group is a primary amino group. Depending upon whether the polyoxyalkylene amine is a mono-, di-, or triamine, each compound can contain, respectively, one, two, or three amino groups, e.g. primary amino groups, with each group being attached to the terminus of a polyether backbone. Accordingly, one or more polyether backbones may be necessary to accommodate the number of terminal amino groups. Further description of polyoxyalkylene amines and their use is as disclosed in U.S. Pat. No. 7,714,051, fully incorporated herein by reference. Suitable polyoxyalkylene amines include polyoxyalkylene mono-, di-, and triamines commercially available from Huntsman Chemical of The Woodlands, Tex. and sold under the tradename JEFFAMINE®.

Polymeric amine may be used in an amount ranging from 0.15 to 0.45 phr. In one embodiment, the polymeric amine is used in an amount ranging from 0.2 to 0.4 phr. In one embodiment, the polymeric amine is used in an amount ranging from 0.2 to 0.3 phr.

The rubber composition further includes an aromatic carboxylic acid or aromatic acid anhydride. Suitable aromatic carboxylic acids include but are not limited to benzoic acid and hydroxybenzoic acids, such as 2-hydroxybenzoic acid (salicylic acid), 3-hydroxybenzoic acid, and 4-hydroxybenzoic acid, substituted versions thereof, and the like. Suitable aromatic acid anhydrides include phthalic anhydride, benzoic anhydride, substituted versions thereof, and the like.

In one embodiment, the aromatic carboxylic acid or aromatic acid anhydride may be used in an amount greater than, or in excess of, that used for the polymeric amine. In one embodiment, the weight ratio aromatic carboxylic acid or aromatic acid anhydride to polymeric amine is at least 1. In one embodiment, the weight ratio aromatic carboxylic acid or aromatic acid anhydride to polymeric amine is at least 2. In one embodiment, the weight ratio aromatic carboxylic acid or aromatic acid anhydride to polymeric amine is at least 3. In one embodiment, the weight ratio aromatic carboxylic acid or aromatic acid anhydride to polymeric amine ranges from 1.5 to 2.5, i.e., 1.5 to 2.5 parts by weight of aromatic carboxylic acid or aromatic acid anhydride per 1 part by weight of the polymeric amine. In one embodiment, the amount of aromatic carboxylic acid or aromatic acid anhydride ranges from 1.8 to 2.2 parts by weight per 1 part by weight of the polymeric amine.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard 2000 Parts*, 2003, 62nd edition, published by the Institute of Petroleum, United Kingdom.

The rubber composition may include from about 50 to about 150 phr of silica. In another embodiment, from 60 to 120 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 1 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the bis (trialkloxysilylalkyl) polysulfides, including 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

In this example, the effect of compounding a polymeric amine and an aromatic acid with a diene rubber is illustrated, where equal weight amounts of the amine and acid are used.

Rubber compounds were mixed in a laboratory mixer in a multi-step mixing process following the recipe given in Table 1 (all amounts in phr). Polyethyleneimine (PEI) was added in a first non-productive mix step. An equal amount by weight of salicylic acid (i.e. salicylic acid/polyethyleneimine=1) was added to all compounds during a second non-productive mix step. All compounds further included standard amounts of compounding additives, such as oils, waxes, antidegradants, and curatives. Four rubber compounds were mixed accordingly.

The mixed compounds were tested for cure, rolling resistance and wear properties with results given in Table 2.

$T_{25}$ was used as an indicator of scorch. Such "T-points" (i.e., $T_{90}$, T25, T80, etc.) represent vulcanization states, are recognizable to one skilled in the art and are defined in ASTM D2084, D5289 and ISO 6502 and are fully described in a presentation given by H. G. Buhrin at Tyretech '90 in Brighton, England, Nov. 5-6 1990. The T-points may be determined using the Flexsys Rubber Process Analyzer (RPA) 2000. A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, Apr. 26 and May 10, 1993.

Rebound at 60° C. was used as an indicator of rolling resistance. Rebound was measured using a Zwick rebound tester according to ASTM D1054.

DIN abrasion was used as an indicator of wear resistance. Wear data were measured according to DIN 53516 or ASTM D5963 abrasion resistance test procedure using a Zwick drum abrasion unit, model 6102 with 2.5 Newtons force. DIN standards are German test standards.

TABLE 1

| | |
|---|---|
| Styrene-Butadiene[1] | 70 |
| Polybutadiene[2] | 30 |
| Silica | 65 |
| Polyethyleneimine | variable as in Table 2 |
| Salicylic Acid | variable as in Table 2 |

[1]Styrene-butadiene rubber with 21% styrene, 63% vinyl, Tg = −25° C., functionalized with sulfanylsilyl (i.e. sulfide-silane) groups, as Sprintan SLR 4602 from Styron.
[2]High cis polybutadiene, as Budene 1207 from Goodyear.

TABLE 2

| Sample No. | 1 | 2 | 3 | 4 |
|---|---|---|---|---|
| Polyethyleneimine | 0 | 0.4 | 0.75 | 1.1 |
| Salicylic Acid | 0 | 0.4 | 0.75 | 1.1 |
| SA/PEI[3] | — | 1 | 1 | 1 |
| $T_{25}$, min | 9.45 | 2.61 | 1.52 | 1.46 |
| Rebound 60° C. | 61 | 64 | 63 | 63 |
| DIN Abrasion, mm³ loss | 106 | 102 | 99 | 100 |

[3]PEI = Polyethyleneimine, SA = salicylic acid, expressed as weight ratio

As seen in Table 2, rolling resistance as indicated by rebound at 60° C. shows desirably higher values for samples 2 through 4 as compared to control sample 1. Likewise, the wear as indicated by DIN abrasion shows desirably lower values for sample 2 through 4 as compared to control sample 1. However, samples 2 through 4 show a much lower T25 value that the control sample 1, indicating an unacceptable scorch due to rapid cure.

EXAMPLE 2

The procedures of Example 1 were repeated, using a weight ratio of salicylic acid to polyethyleneimine of 3:1. Results are given in Table 3.

TABLE 3

| Sample No. | 5 | 6 |
|---|---|---|
| Polyethyleneimine | 0 | 0.4 |
| Salicylic Acid | 0 | 1.2 |
| SA/PEI[3] | — | 3 |
| $T_{25}$, min | 8.02 | 10.22 |
| Rebound 60° C. | 59 | 61 |
| DIN Wear Abrasion, mm³ loss | 100 | 99 |

[3]PEI = Polyethyleneimine, SA = salicylic acid, expressed as weight ratio

As seen in Table 3, T25 for sample 6 was somewhat higher that for the control sample 5, indicating too low of a cure rate.

EXAMPLE 3

The procedures of Example 1 were repeated, using a weight ratio of salicylic acid to polyethyleneimine of 2:1. Results are given in Table 4.

TABLE 4

| Sample No. | 7 | 8 |
|---|---|---|
| Polyethyleneimine | 0 | 0.4 |
| Salicylic Acid | 0 | 0.8 |
| SA/PEI[3] | — | 2 |
| $T_{25}$, min | 8.54 | 7.25 |
| Rebound 60° C. | 62 | 65 |
| DIN Wear Abrasion, mm³ loss | 137 | 122 |

[3]PEI = Polyethyleneimine, SA = salicylic acid, expressed as weight ratio

As seen in Table 4, T25 for sample 8 shows an acceptable T25 compared to control sample 7.

EXAMPLE 4

The procedures of Example 1 were repeated, using a weight ratio of salicylic acid to polyethyleneimine of 2:1 and a wider range of polyethyleneimine amounts. The rubber compositions included 67 phr of the styrene-butadiene rubber (SLR 4602), 33 phr of polybutadiene, 95 phr of silica, and 7.6 phr of Si266 containing a bis(trialkoxysilylalkyl) polysulfide silane coupling agent. Results are given in Table 5, with both rolling resistance and wear resistance indexes included (a high value is desirable for both). FIG. 1 shows a graph of rolling resistance index and wear resistance index against polyethyleneimine amount for an SA/PEI weight ratio of 2.

TABLE 5

| Sample No. | 9 | 10 | 11 | 12 | 13 |
|---|---|---|---|---|---|
| Polyethyleneimine | 0 | 0.2 | 0.4 | 0.6 | 0.8 |
| Salicylic Acid | 0 | 0.4 | 0.8 | 1.2 | 1.6 |
| SA/PEI[3] | — | 2 | 2 | 2 | 2 |
| $T_{25}$, min | 7.1 | 7.5 | 6.6 | 5.9 | 5.6 |
| Rebound 60° C. | 53 | 58 | 56 | 53 | 54 |
| Rolling Resistance Index[4] | 100 | 109 | 106 | 100 | 102 |
| DIN Wear Abrasion, mm³ loss | 111 | 101 | 106 | 109 | 108 |
| Wear Resistance Index[5] | 100 | 109 | 105 | 102 | 103 |

[3]PEI = Polyethyleneimine, SA = salicylic acid, expressed as weight ratio
[4]Rolling Resistance Index = (Rebound/Sample 9 Rebound) * 100
[5]Wear Resistance Index = 100 − [(Wear − Sample 9 Wear)/Sample 9 Wear] * 100

As seen in FIG. 1, surprisingly and unexpectedly, both the rolling resistance index (1) and wear index (2) show a maximum at a polyethyleneimine content range of about 0.15 to 0.45 phr.

While certain representative embodiments and details have been shown for the purpose of illustrating the subject invention, it will be apparent to those skilled in this art that various changes and modifications can be made therein without departing from the scope of the subject invention.

What is claimed is:

1. A vulcanizable rubber composition comprising:
   (A) a diene based elastomer comprising a combination of alkoxysilyl functionality and at least one functionality selected from the group consisting of thiol, thioester, thioether, sulfanyl, mercapto, and sulfide;
   (B) from 50 to 150 parts by weight, per 100 parts by weight of elastomer (phr), of silica;
   (C) from 0.2 to 0.4 phr of polyethyleneimine; and
   (D) from 1.8 to 2.2 parts by weight, per 1 part by weight of the polyethyleneimine, of salicylic acid.

2. The vulcanizable rubber composition of claim 1, wherein the diene based elastomer further comprises at least one elastomer selected from the group consisting of natural polyisoprene, synthetic polyisoprene, polybutadiene, and styrene-butadiene rubber.

3. The vulcanizable rubber composition of claim 1, wherein the diene based elastomer comprises a solution polymerized styrene-butadiene elastomer comprising a combination of alkoxysilyl functionality and at least one functionality selected from the group consisting of thiol, thioester, thioether, sulfanyl, mercapto, sulfide, and combinations thereof.

4. The vulcanizable rubber composition of claim 3, wherein the alkoxysilyl functionality includes at least one of monoalkoxy, dialkoxy, and trialkoxy groups.

5. The vulcanizable rubber composition of claim 1 wherein the diene based elastomer comprises polybutadiene and a styrene-butadiene rubber comprising a combination of alkoxysilyl functionality and at least one functionality selected from the group consisting of thiols, thioesters, and thioethers, sulfanyl, mercapto, sulfide, and combinations thereof.

6. The vulcanizable rubber composition of claim 5, wherein the alkoxysilyl functionality includes at least one of monoalkoxy, dialkoxy, and trialkoxy groups.

7. The vulcanizable rubber composition of claim 1, further comprising from 0.5 to 20 phr of a sulfur containing organosilicon compound.

8. The vulcanizable rubber composition of claim 1, further comprising from 1 to 10 phr of a sulfur containing organosilicon compound.

9. The vulcanizable rubber compound of claim 1, further comprising from 1 to 10 phr of a bis (trialkoxysilylalkyl) polysulfide.

10. The vulcanizable rubber composition of claim 1, wherein the alkoxysilyl functionality includes at least one of monoalkoxy, dialkoxy, and trialkoxy groups.

11. A pneumatic tire comprising the vulcanizable rubber composition of claim 1.

* * * * *